(12) United States Patent
Yu

(10) Patent No.: US 6,247,587 B1
(45) Date of Patent: Jun. 19, 2001

(54) STORAGE DEVICE

(76) Inventor: Jackson Yu, 2F, No. 19, Fu-Hsing-I Rd., Pei-Tou Dist., Taipei City (TW)

( * ) Notice: Subject to any disclaimer, the term of this patent is extended or adjusted under 35 U.S.C. 154(b) by 0 days.

(21) Appl. No.: 09/534,358

(22) Filed: Mar. 24, 2000

(51) Int. Cl.7 .................................................. B65D 85/57
(52) U.S. Cl. ......................... 206/308.1; 206/312; 383/63
(58) Field of Search ................................. 206/308.1, 310, 206/312, 1.5, 307.1, 311; 383/63, 95; 281/16, 26, 34, 35

(56) References Cited

U.S. PATENT DOCUMENTS

| | | |
|---|---|---|
| 825,447 | 7/1906 | Faifer . |
| 2,617,423 | 11/1952 | Miller . |
| 2,777,574 | 1/1957 | Broady . |
| 3,199,768 | 8/1965 | Farmlett . |
| 3,987,900 | 10/1976 | Tadokoro et al. . |
| 4,247,002 | 1/1981 | Horian . |
| 4,488,645 * | 12/1984 | Yamaguchi ........................ 206/464 |
| 4,566,590 * | 1/1986 | Manning et al. .................. 206/232 |
| 4,625,996 | 12/1986 | Hymmen . |
| 4,711,347 * | 12/1987 | Drexier et al. ...................... 206/38 |
| 4,850,731 | 7/1989 | Youngs . |
| 4,863,032 | 9/1989 | Bothe et al. . |
| 4,872,538 * | 10/1989 | Fournier .............................. 190/111 |
| 4,961,522 * | 10/1990 | Weber .................................. 190/119 |
| 4,966,260 * | 10/1990 | Young ................................. 190/111 |
| 4,971,195 | 11/1990 | Mitsuyama . |
| 5,058,761 * | 10/1991 | Williams ............................. 383/63 |
| 5,207,717 * | 5/1993 | Manning ............................ 206/232 |
| 5,290,118 | 3/1994 | Ozeki . |
| 5,344,015 * | 9/1994 | Carlin et al. ....................... 206/449 |
| 5,375,706 | 12/1994 | Perez . |
| 5,396,987 | 3/1995 | Temple et al. . |
| 5,462,160 | 10/1995 | Youngs . |
| 5,556,683 | 9/1996 | Ranalli . |
| 5,588,528 | 12/1996 | Ozeki . |
| 5,609,249 | 3/1997 | Cheng . |
| 5,743,565 | 4/1998 | Zimmanck . |
| 5,765,873 | 6/1998 | Chen . |
| 5,833,063 | 11/1998 | Ho . |
| 5,865,469 | 2/1999 | Chin . |
| 5,944,353 | 8/1999 | Sato . |
| 5,947,524 | 9/1999 | Podosek . |

* cited by examiner

Primary Examiner—Paul T. Sewell
Assistant Examiner—Shian Luong
(74) Attorney, Agent, or Firm—Baker Botts L.L.P.

(57) ABSTRACT

A storage device includes a pair of opposite plastic flat bags and a releasable interlocking member. The bags have peripheral edges, each of which confines an inner space adapted for receiving substantially planar articles. The peripheral edges of the bags have bottom sections hinged to one another so that the bags are turnable respectively relative to the bottom sections for moving toward and away from one another. The releasable interlocking member is formed on and extends along remaining sections of the peripheral edges for adjoining tightly the remaining sections of the peripheral edges when the bags move toward one another.

6 Claims, 5 Drawing Sheets

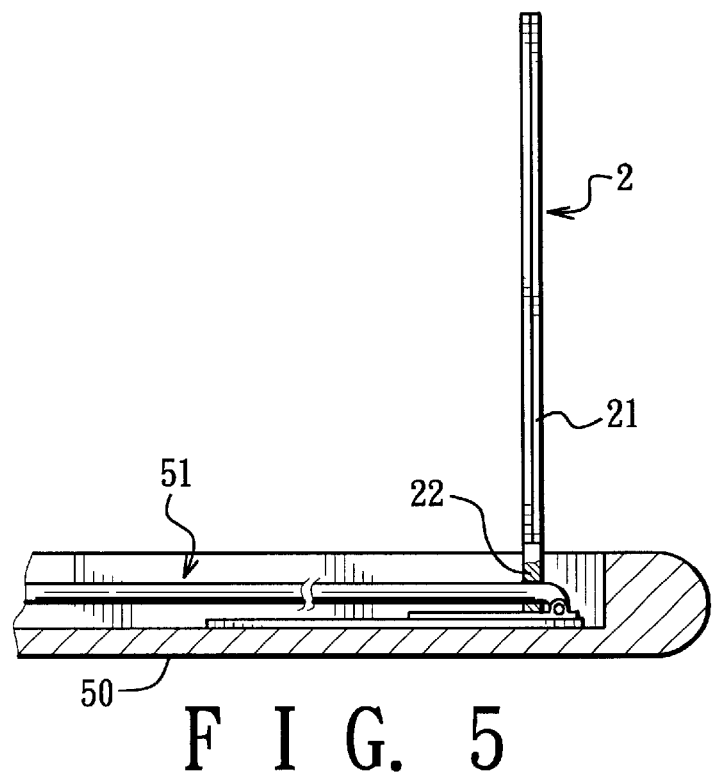
F I G. 5
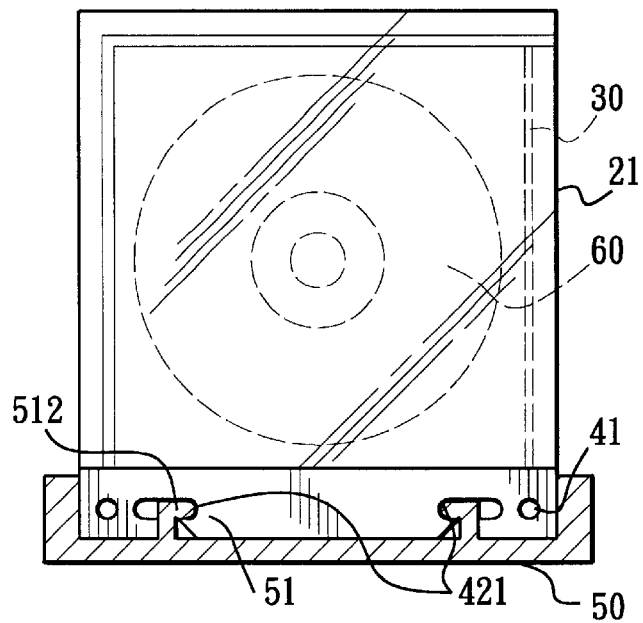
F I G. 6a

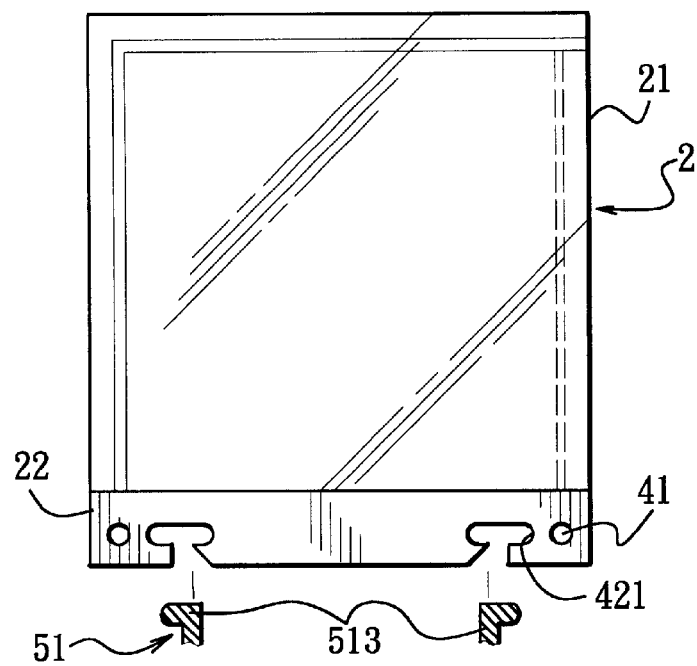
F I G. 6b
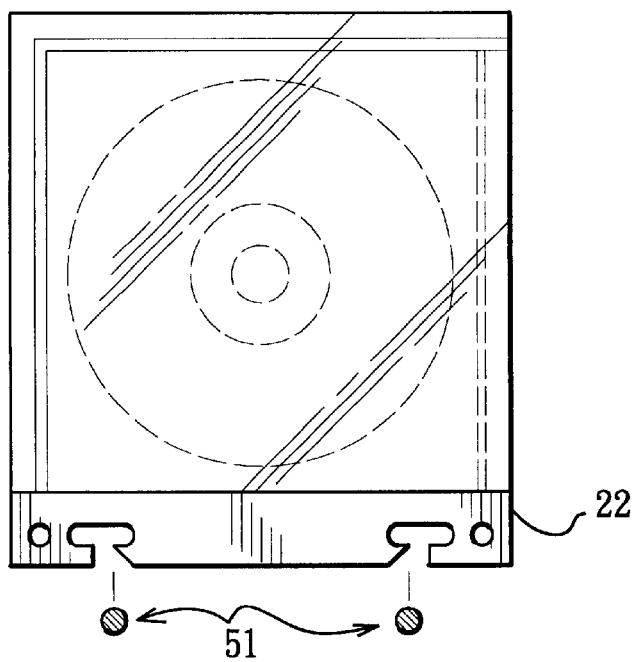
F I G. 6c

STORAGE DEVICE

BACKGROUND OF THE INVENTION

1. Field of the Invention

This invention relates to a storage device for storing planar articles, such as compact disks.

2. Description of the Related Art

Storage devices for storing planar articles, such as compact disks and the like, have existed in various forms, such as rigid plastic cases or jewel cases, shelves and bookcase-type storage units, and flexible storage bags. A conventional flexible storage bag normally includes a plastic sheet member which is folded such that the two opposite ends of the plastic sheet member are adjoined together and are attached securely to a rigid plate-shaped connecting member, and which is sealed along a portion of the perimeter of the sheet member at one side of the sheet member for forming an opening at the other side of the sheet member for receiving a compact disk. The connecting member has a pair of spaced apart slots that are adapted to receive slidably and respectively two parallel elongated rails in a conventional disk storage unit. Since the aforesaid storage bag is open at one side, the compact disk can only be protected partially against dust and the like when stored in the storage bag. Moreover, the compact disk is liable to slip off from the storage bag via the opening during trnasport.

SUMMARY OF THE INVENTION

Therefore, the object of the present invention is to provide a storage device that is capable of overcoming the aforementioned problems.

Accordingly, a storage device of this invention comprises: a pair of opposite plastic flat bags having peripheral edges, each of which confines an inner space adapted for receiving substantially planar articles, the peripheral edges of the bags having bottom sections hinged to one another so that the bags are turnable respectively relative to the bottom sections for moving toward and away from one another; and a releasable interlocking member formed on and extending along remaining sections of the peripheral edges for adjoining tightly the remaining sections of the peripheral edges when the bags move toward one another.

BRIEF DESCRIPTION OF THE DRAWINGS

In drawings which illustrate an embodiment of the invention,

FIG. 5 is a fragmentary cross-sectional side view of the disk storage housing of FIG. 2; and FIGS. 6a to 6c illustrate alternative configurations of the rails of FIG. 4 received in the slots in the storage device of FIG. 1.

DETAILED DESCRIPTION OF THE PREFERRED EMBODIMENT

Figure 1:
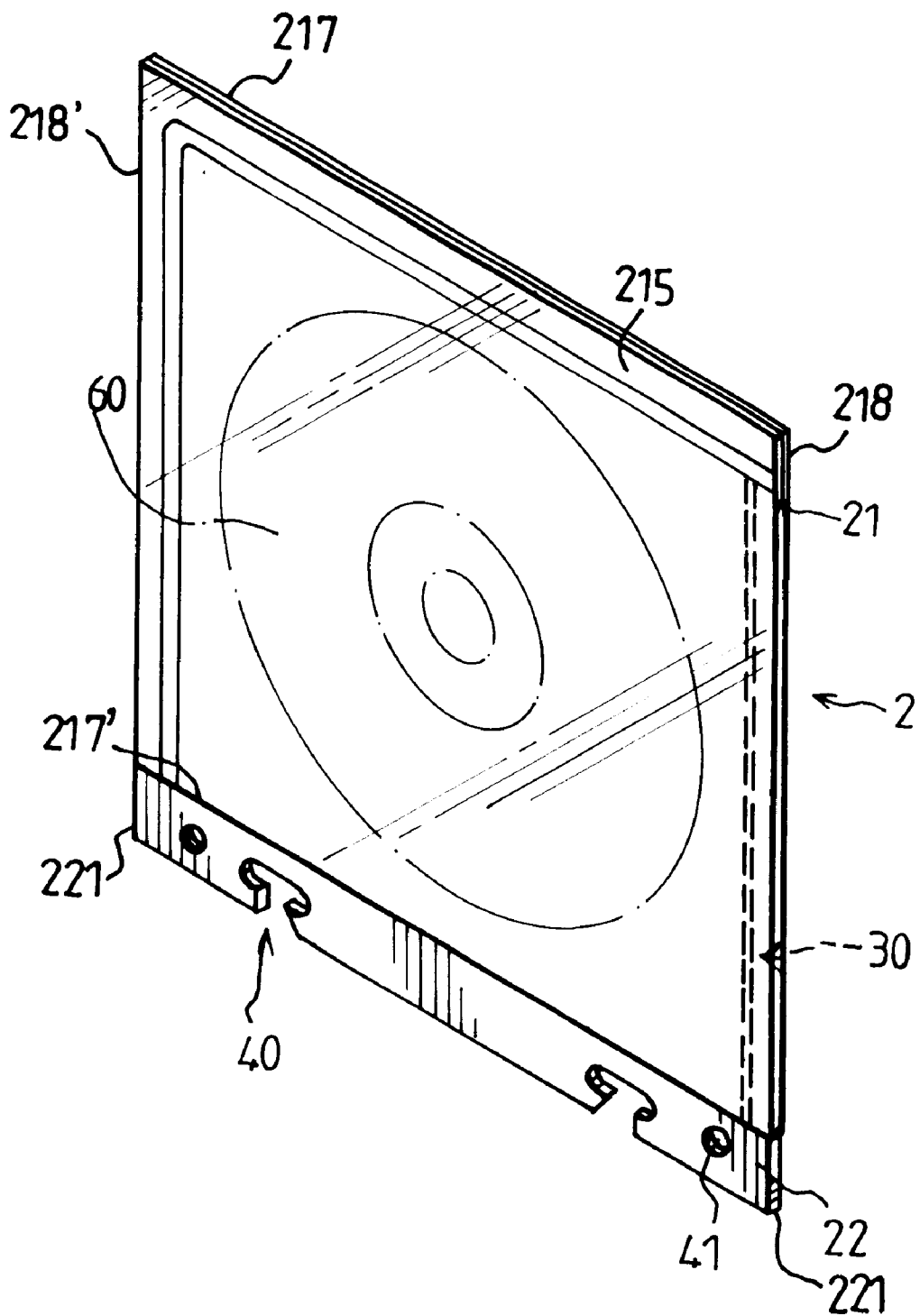
FIG. 1 is a perspective view of a storage device embodying this invention.
Figure 2:
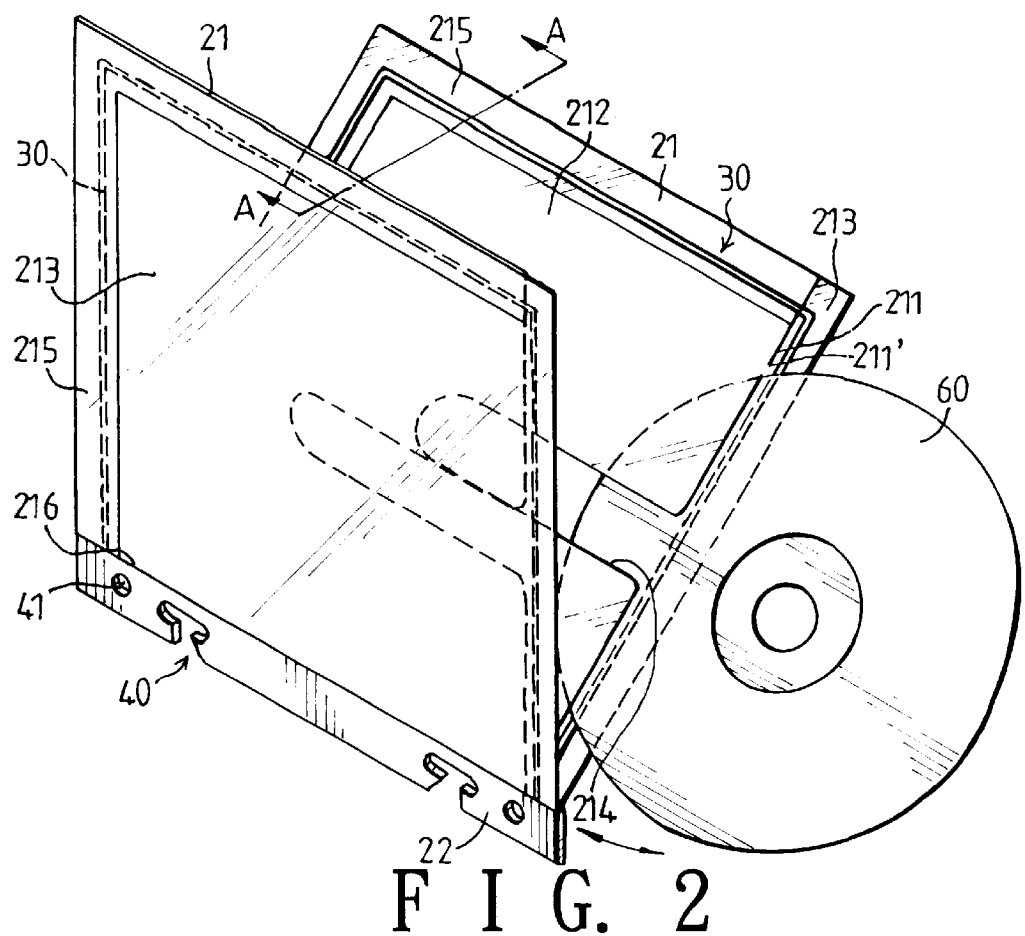
FIG. 2 is a perspective view of the storage device of FIG. 1 having two opposite bags in a separated state.
Figure 3:
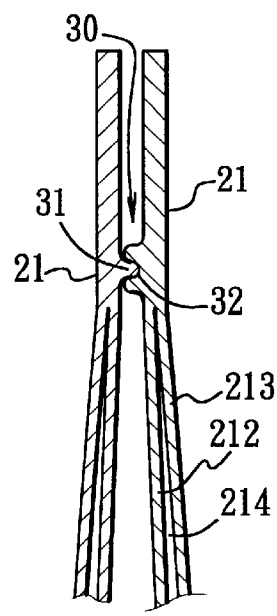
FIG. 3 is a fragmentary cross-sectional side view taken along line A—A of FIG. 2.

FIGS. 1 to 3 illustrate a storage device 2 embodying this invention. The storage device 2 includes a pair of opposite plastic four-sided flat bags 21, each of which has top and bottom sides 217, 217' and front and rear sides 218, 218', and a peripheral edge 215 extending along the top, front, bottom, and rear sides 217, 218, 217', 218' and confining an inner space 214 which is adapted for receiving a compact disk 60. Each of the bags 21 includes an outer sheet member 213 and an inner sheet member 212 overlying the outer sheet member 213. The inner and outer sheet members 212, 213 are sealed at a portion of the respective peripheral edge 215 which extends along the top, rear, and bottom sides 217, 218', 217' of the respective bag 21. Each inner sheet member 212 has a side end 211 separate from the respective outer sheet member 213 adjacent to the front side of the respective bag 21 to define with the respective outer sheet member 213 an opening 211' for access to the inner space 214. The inner sheet members 212 of the bags 21 confront one another. The peripheral edges 215 of the bags 21 have bottom sections 216 which extend along the bottom sides of the bags 21, and which are hinged to one another and which are connected securely to a rigid elongated plate-shaped connecting member 22 so that the bags 21 are turnable relative to the connecting member 22 for moving toward and away from one another.

A releasable interlocking member 30 is formed on and extends from one end to the other end of the bottom section 216 of the peripheral edge 215 along the remaining section of the peripheral edge 215 of each bag 21, which extends along the rear, top, and front sides 218', 217, 218 of each bag 21, for adjoining tightly the remaining sections of the peripheral edges 215 of the bags 21 when the bags 21 move toward one another. Each interlocking member 30 includes a tongue-and-groove unit which has a tongue portion 31 formed integrally on and extending along the remaining section of the peripheral edge 215 of one of the bags 21, and a groove portion 32 formed integrally on and extending along the remaining section of the peripheral edge 215 of the other one of the bags 21. The side end 211 of the inner sheet member 212 of each bag 21 extends inwardly of the interlocking member 30 adjacent to the front side 218 of the bag 21.

Figure 4:
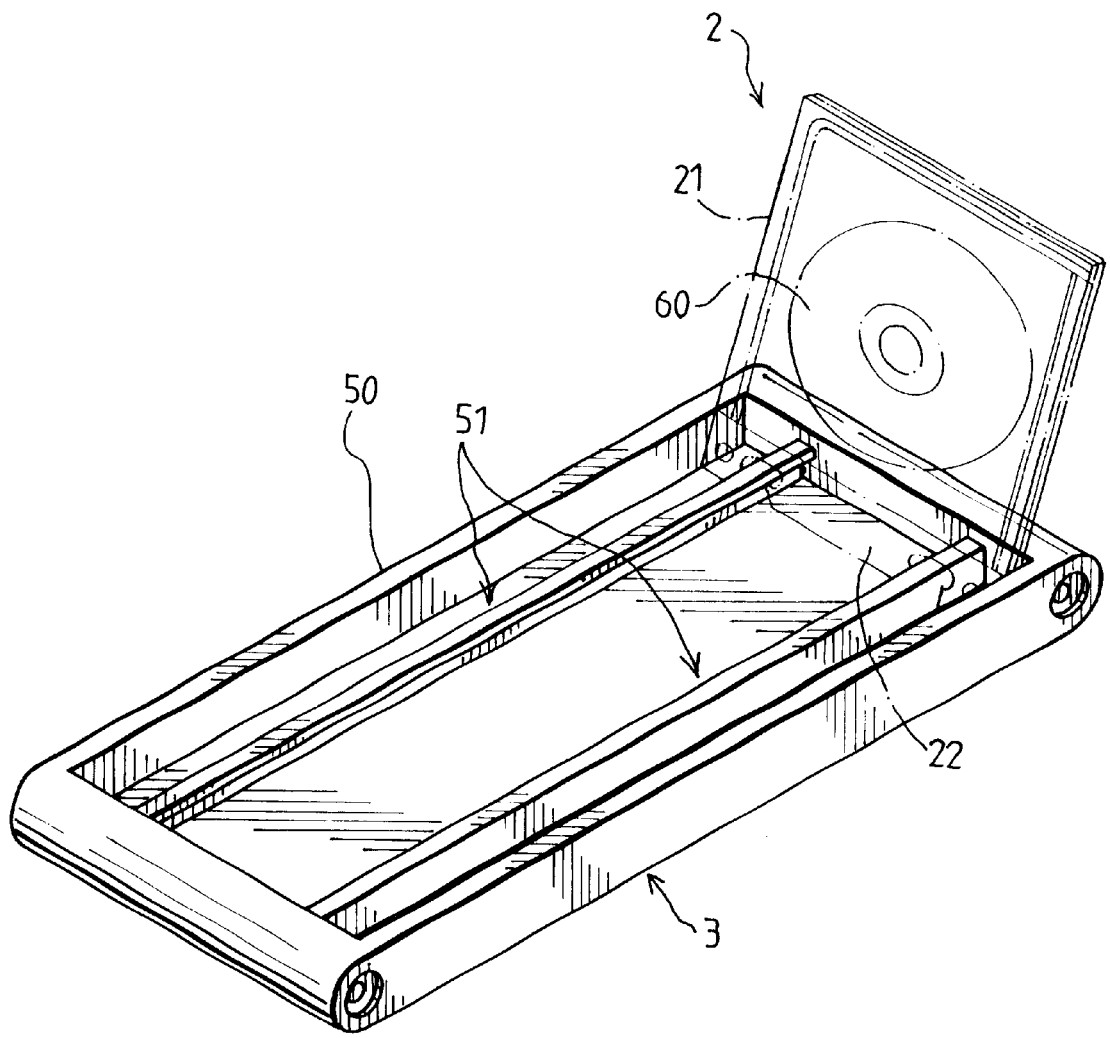
FIG. 4 is a schematic perspective view illustrating a disk storage housing having a pair of rails received in two slots in the storage device of FIG. 1.

Referring now to FIGS. 4 and 5, in combination with FIG. 1, the connecting member 22 has top and bottom ends, two opposite side ends 221 interconnecting the top and bottom ends, a pair of spaced apart through-holes 41 formed therein between the opposite side ends 221, and a pair of spaced apart T-shaped slots 40 extending from the bottom end toward the top end and disposed between the through-holes 41. The bottom sections 216 of the peripheral edges 215 of the bags 21 are affixed to the top end of the connecting member 22. The storage device 2 is adapted to be stored in a disk storage unit 3 which includes a housing 50, and a pair of parallel rails 51 extending longitudinally in the housing 50. The T-shaped slots 40 in the connecting member 22 receive respectively the rails 51 so that the storage device 2 is supported by the rails 51, and projects uprightly therefrom.

Referring now to FIGS. 6a to 6c in combination with FIGS. 4 and 5, the rails 51 of the disk storage unit 3 can have an inverted L-shaped cross-section (see FIGS. 6a and 6b), or a circular cross-section (see FIG. 6c). In the case of the inverted L-shaped, cross-section, the rails 51 have neck portions 421 (see FIG. 6a) or neck portions 513 (see FIG. 6b) that engage portions of inner edges 421 of the T-shaped slots 40 in the connecting member 22.

With the interlocking member 30, the storage device 2 of this invention is capable of protecting the stored compact disk(s) 60 against dust and the like, and of preventing the compact disk(s) 60 from slipping off from the storage device 2 during transport.

With the invention thus explained, it is apparent that various modifications and variations can be made without departing from the spirit of the present invention. It is therefore intended that the invention be limited only as recited in the appended claims.

I claim:

1. A storage device adapted for storing substantially planar articles comprising:

a pair of opposite plastic flat bags having peripheral edges, each of which confines an inner space adapted for receiving the substantially planar articles, said peripheral edges of said bags having bottom sections hinged to one another so that said bags are turnable respectively relative to said bottom sections for moving toward and away from one another;

a releasable interlocking member formed on and extending along remaining sections of said peripheral edges for adjoining tightly said remaining sections of said peripheral edges when said bags move towards one another; and a rigid elongated plate-shaped connecting member which has top and bottom ends, two opposite side ends interconnecting said top and bottom ends, and a pair of spaced apart T-shaped slots extending from said bottom end toward said top end between said opposite side ends of said connecting member, said bottom sections of said peripheral edges of said bags being connected to said top end of said connecting member between said opposite side ends of said connecting member.

2. The storage device of claim 1, wherein said interlocking member includes a tongue-and-groove unit which has a tongue portion formed integrally on and extending along said remaining section of said peripheral edge of one of said bags, and a groove portion formed integrally on and extending along said remaining section of said peripheral edge, of the other one of said bags.

3. The storage device of claim 1, wherein said connecting member further has a pair of spaced apart through-holes formed therein between said opposite side ends of said connecting member, said T-shaped slots being disposed between said through-holes of said connecting member.

4. The storage device of claim 1, wherein each of said bags has an outer sheet member and an inner sheet member overlying and connecting with said outer sheet member, said inner sheet member having a side end separate from said outer sheet member so to define with said outer sheet member an opening for access to said inner space, said inner sheet members of said bags confronting one another and being moveable towards and away from one another, said interlocking member including a tongue-and-groove unit formed integrally on and extending continuously along said remaining sections of said peripheral edges of said bags, said side ends of said inner sheet members extending inwardly of said interlocking member.

5. The storage device of claim 4, wherein said tongue-and-groove unit includes a tongue portion formed on said peripheral edge of one of said bags, and a groove portion formed on said peripheral edge of the other one of said bags.

6. The storage device of claim 5, further comprising a rigid elongated plate-shaped connecting member extending along and connected to said bottom sections of said peripheral edges of said bags.

* * * * *